United States Patent [19]

Cook et al.

[11] 3,740,491

[45] June 19, 1973

[54] DIGITAL MAGNETIC TAPE RECORDING SYSTEM USING SYMMETRICAL DIFFERENTIAL PULSE WIDTH MODULATION WITH A TRIANGULAR REFERENCE SIGNAL

[76] Inventors: George W. Cook, 1637 Wrightson Drive, McLean, Va.; Robert G. Stilwell, 318 2nd St. S.E., Washington, D.C.

[22] Filed: Apr. 23, 1971

[21] Appl. No.: 136,690

[52] U.S. Cl. ..... 179/100.2 R, 332/9 R, 340/174.1 G

[51] Int. Cl. .............................................. G11b 5/06

[58] Field of Search ......... 179/100.2 R, 100.2 MD, 179/100.2 S; 340/174.1 G, 174.1 H; 325/142; 332/9 R, 9 T, 15

[56] References Cited

UNITED STATES PATENTS

| | | | |
|---|---|---|---|
| 2,950,352 | 8/1960 | Bleck | 179/100.2 R |
| 2,972,128 | 2/1961 | Eckert, Jr. et al. | 340/174.1 G |
| 3,009,025 | 11/1961 | Takayanagi et al. | 179/100.2 R |
| 3,509,549 | 4/1970 | Ohta et al. | 179/100.2 S |
| 3,167,720 | 1/1965 | Sharma | 332/9 T |
| 3,551,851 | 12/1970 | Engel | 332/15 |
| 3,170,125 | 2/1965 | Thompson | 332/15 |

*Primary Examiner*—Bernard Konick
*Assistant Examiner*—Alfred H. Eddleman
*Attorney*—R. S. Sciascia, Q. E. Hodges and M. J. Sliwka

[57] ABSTRACT

The present invention relates to a recording system capable of providing either an analog or a digital output signal. The system includes: a symmetrical triangular wave generator; information signal sensing transducers; pulse width modulator means for producing a symmetrical output pulse signal; semi-permanent real-time recording means for recording the modulator output pulses; and output means for providing both an analog and digital output signal from the system.

6 Claims, 5 Drawing Figures

INVENTORS
GEORGE W. COOK
ROBERT G. STILWELL
BY M J Sliwka AGENT
L Hodges ATTORNEY INVENTORS
GEORGE W. COOK
ROBERT G. STILWELL
BY M J Slinka AGENT
D. Hodges ATTORNEY INVENTORS
GEORGE W. COOK
ROBERT G. STILWELL
BY M J Sliwka
AGENT
[signature]
ATTORNEY

INVENTORS
GEORGE W. COOK
ROBERT G. STILWELL
BY
AGENT
ATTORNEY

DIGITAL MAGNETIC TAPE RECORING SYSTEM USING SYMMETRICAL DIFFERENTIAL PULSE WIDTH MODULATION WITH A TRIANGULAR REFERENCE SIGNAL

The invention described herein may be manufactured and used by or for the Government of the United States of America for Governmental purposes without the payment of any royalties thereon or therefor.

BACKGROUND OF THE INVENTION

The present invention relates to a system for real-time recording on magnetic tape of any phenomenon which may be represented by a time-varying voltage.

Heretofore the accomplishments of the present invention have been performed using frequency modulation—or direct-type recorders and their associated interfacing equipment. In either case the output is a time-varying analog voltage having poor amplitude accuracy, and expensive, bulky, and complex equipment must be utilized to convert these analog signals to a form suitable for high-speed digital computer use.

The accuracy of an FM recording system is highly dependent on precise tape speed control. Extremely heavy and expensive tape speed control mechanisms are required and effect only mediocre performance. Direct recorders are susceptible to a lesser extent to tape speed variations, but are frequency-limited at the low end of their bandwidth, and will not record d.c. signals at all. Accuracy of a direct recording system is even poorer than that of an FM system, while still requiring expensive and complex equipment.

DESCRIPTION OF THE PRIOR ART

The closest prior art to the present invention known to applicants is disclosed in the U.S. Pat. to Belck, No. 2,950,352, relating to a system for recording and reproducing signal waves. This patent discloses a pulse width modulation technique employing a non-symmetrical triangular wave as the modulating wave. However, this patent does not teach the use and advantages obtained by employing a symmetrical triangular modulating wave. Since this is not taught the above system suffers from the following problems:

First, the system disclosed in Belck cannot be used and is not intended to be used to supply digital information directly to a digital computer.

Second, the analog output signal from the demodulator contains errors due to the intermodulation signals generated in the demodulator. The intermodulation signals are generated because the pulse signals of this system do not have equally spaced energy centers, and because of the variation in frequency of the pulse signals.

OBJECTS OF THE INVENTION

An object of the invention is to record a.c. and d.c. analog signals with an absolute amplitude accuracy of better than 1 percent without the need for precise tape speed control.

Another object of the invention is to record directly on magnetic tape in a format compatible with not only analog retrieval techniques but also with digital retrieval techniques.

Another object of the invention is to record directly on magnetic tape in a format which is suited for direct entry of data into a digital computer without the use of intermediate format translations.

Another object of the invention is to achieve the above objects by using inexpensive and highly portable equipment.

SUMMARY OF THE INVENTION

The present invention employs a form of pulse width modulation being known as symmetrical differential pulse width modulation to provide a recording system for making semi-permanent, real-time recordings of physical phenomena, or any other phenomenon which can be represented by a time-varying voltage. More specifically the invention has as its purposes the recording of phenomena with high accuracy over a wide frequency bandwidth extending on the low frequency end to d.c., utilizing equipment of low cost and light weight, and hence, high portability. Moreover, the invention provides in addition to a high accuracy analog output, a simultaneous high accuracy digital output suitable for entry into a high-speed computer without the use of any intermediate equipment.

DESCRIPTION OF THE PREFERRED EMBODIMENT

The present recording system uses a special type of pulse width modulation (PWM) which will be called symmetrical differential pulse width modulation (SDPWM). Utilizing this modulation technique by recording the SDPWM signal directly on magnetic tape, circumvents the need for precise and critical tape speed control.

Figures 1A, 1B:
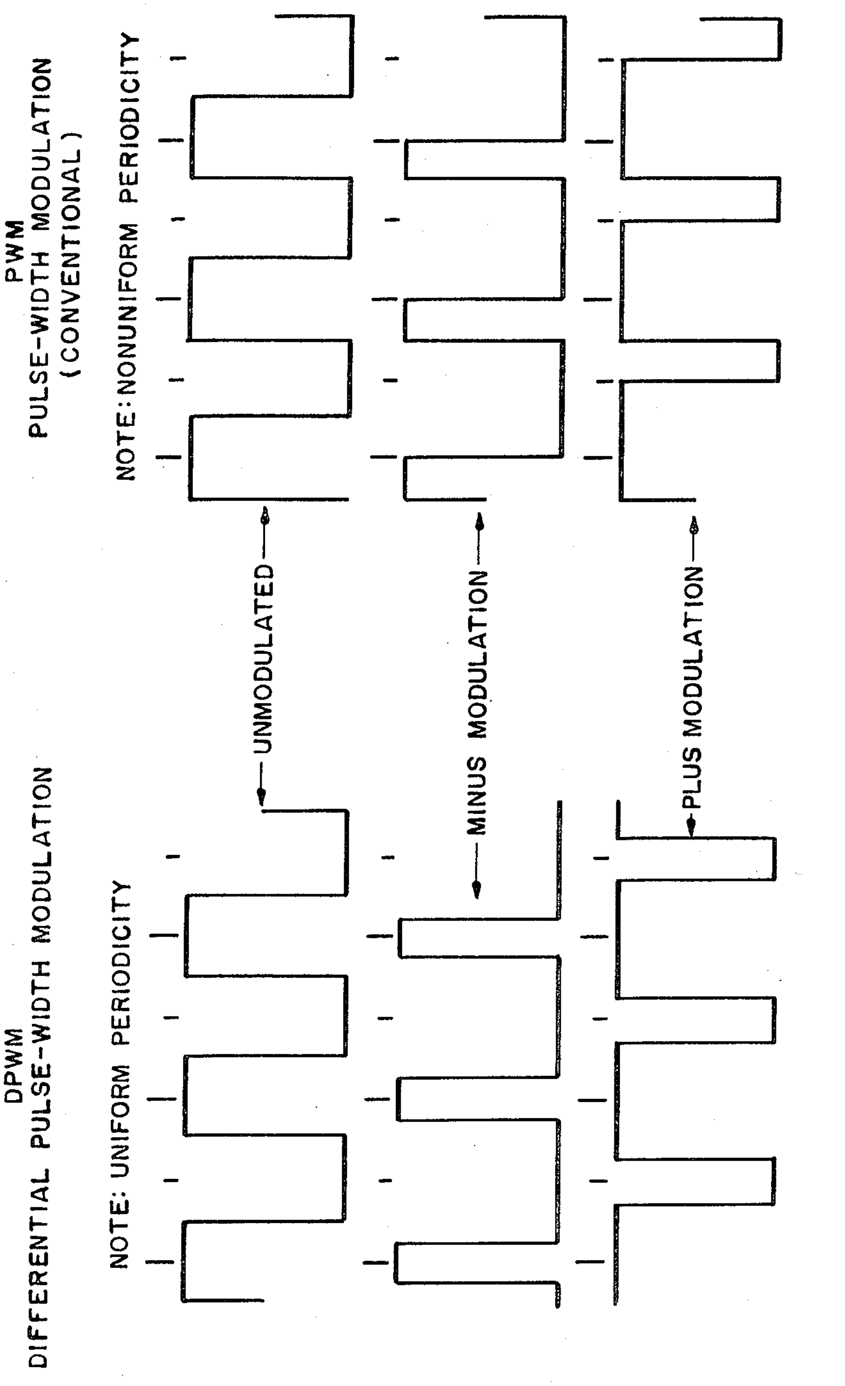
FIGS. 1*a*, and 1*b* are a representation of the uniform periodicity of the output wave of a symmetrical differential pulse width modulation system compared to that of an ordinary pulse width modulation system.

The significant difference between the SDPWM and the conventional PWM is illustrated graphically in FIG. 1. Note that the repetition rate or periodicity of the SDPWM shown in FIG. 1*a*, remains constant and the time position of each plus and minus portion of the wave is unaltered with modulation. Note also that the conventional PWM shown in section FIG. 1*b*, is not thus symmetrically arrayed. Modulation produces series changes in the time-phase position of each plus and minus portion of the wave, thus generating cross-modulation products or "Bessel Function" errors with resultant distortion of multifrequency waveforms. Similar distortions occur in all FM and PM systems.

The modulation process using SDPWM, unlike other systems such as Fm, PM, PWM, etc., is singularly free from this cross-product or "Bessel Function" distortions of multifrequency waveforms. Idealistically, SDPWM provides a distortionless sampling operation. From a practical viewpoint, phase and amplitude distortion of the modulating or signal voltage are almost nonexistent.

Figure 2:
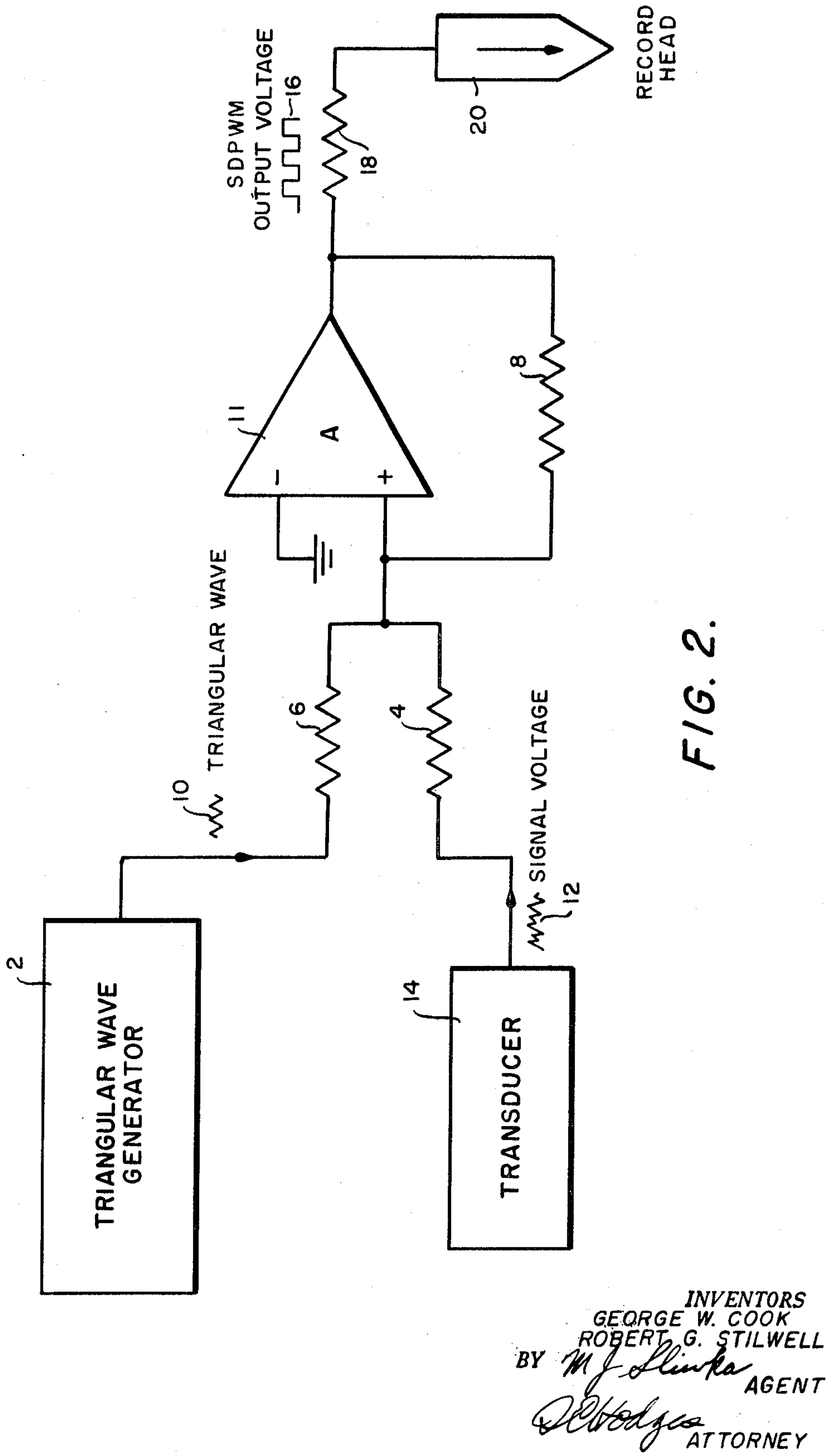
FIG. 2 shows a typical schematic of the modulator used in the present symmetrical differential pulse width modulation system.

The method for utilizing SDPWM for magnetic tape recording begins with the modulation process. As shown in FIG. 2, a triangular wave generator 2, is used to generate a precise triangular voltage wave 10. It is required that the magnitude of the plus and minus slopes of the sides of this triangular wave be precisely equal, that the time durations of the positive and negative sides of the triangular wave be precisely equal, and that the zero voltage line of the wave be exactly in the center of said wave. Only one such triangular wave is needed regardless of the number of channels in the reocrder.

The modulator is shown in FIG. 2, and consists of resistors 4, 6, and 8, and an operational amplifier 11. Although only a single channel is illustrated, the number of channels is limited only by the number of recording tracks on the tape recorder. The modulation method consists in adding, through a linear resistive network, resistors 4 and 6, a replica of the triangle wave 10, and the d.c. analog signal voltage 12, from a transducer 14. This composite voltage is imposed on the positive input terminal of the operational amplifier 11.

Figure 3:
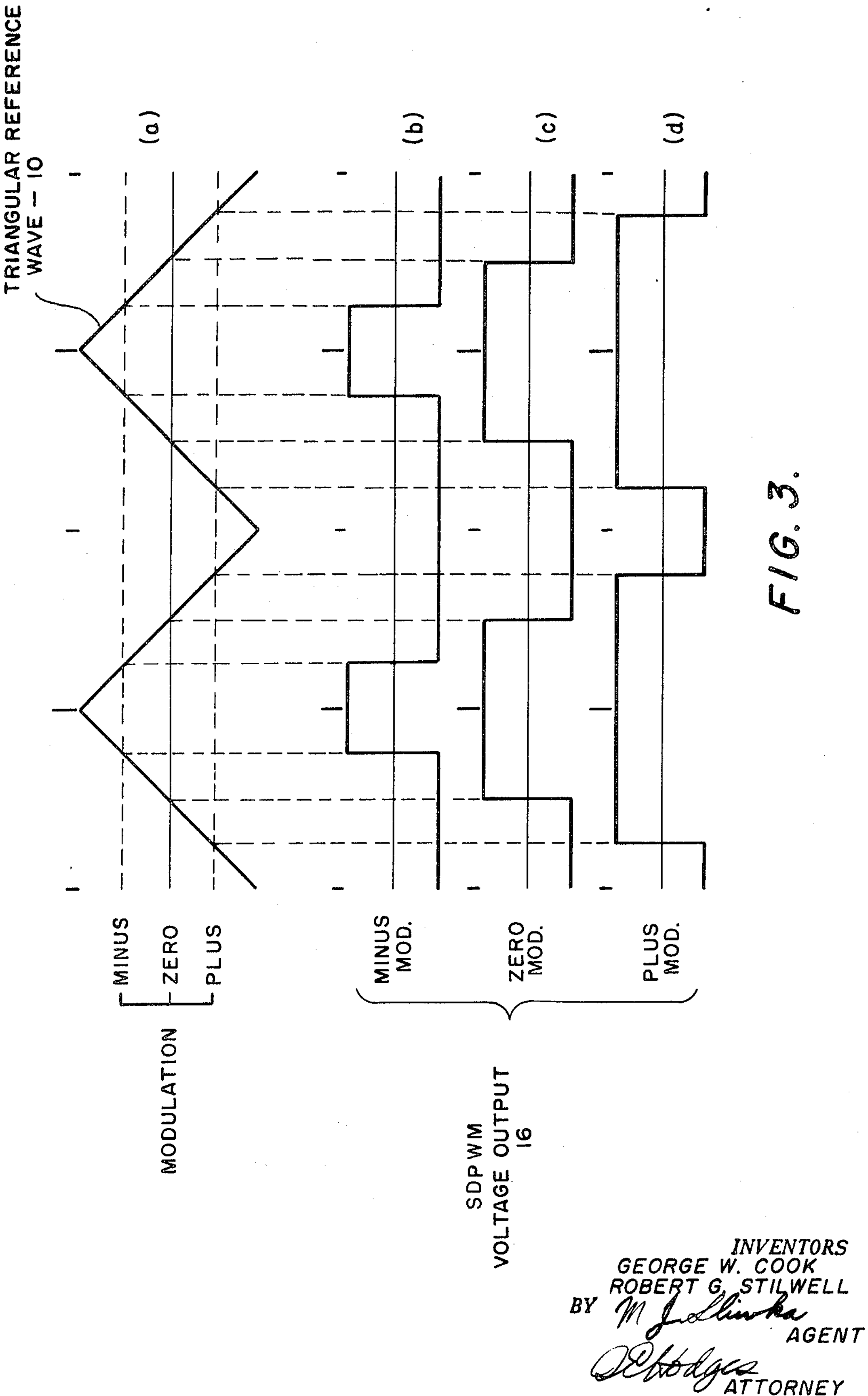
FIGS. 3*a*, *b*,*c*, and d are a graphical representation of the triangular and modulated output waves in a symmetrical differential pulse width modulation system.

The amplifier 11 operates with an open-loop voltage gain in excess of 50,000. A small amount of positive feedback is introduced by resistor 8, as shown. The amplifier is thus bistable in that the output is latched at either its positive or negative saturation voltage level. A slight amount of positive feedback is used to assure a high rate of transition. The amplifier is induced to change its state whenever the positive input terminal voltage crosses zero, thus changing sign; i.e., from positive to negative or vice-versa. If the signal voltage 12, from the transducer 14, is zero, the voltage output 16, at the output of the amplifier switches from one bistable state to the other with each zero crossing in the triangular reference voltage 10. The result is a perfectly symmetrical square wave. See FIGS. 3*a* and 3*c*.

Any signal voltage 12, which issues from the transducer moves the effective zero line of the triangular wave 10 and changes the switch-over point for the amplifier 11, thus upsetting the symmetry of the square wave voltage 16. See FIGS. 3*a*, 3*b*, and 3*d*. The resultant asymmetry in wave 16, is precisely and directly proportional to the sense and magnitude of the signal voltage 12. It is also related to the amplitude ratio of the signal and reference voltages 12/10 as modified by the resistance ratio of the two adding resistors 4 and 6. The overall sensitivity of the device is readily controlled by adjusting this resistance ratio.

Because of the current limiting resistor 18, the recording operation is quite simple; the current in the recording head 20, saturates the magnetic tape alternately in one sense and then in the other, in accordance with the sense of the output voltage.

Note the utter simplicity of the "modulation" operation; the absence of frequency sensitive components and the nonlinear elements usually required for a modulation process.

On playback, the symmetrical DPWM technique has a valuable attribute, which is, data similtaneously available in two modes or forms. The first form is digital in any useful format to feed an automatic computer, and the second form is conventional analog for feeding an analog computer or for transcription via a direct recorder system.

Figure 4:
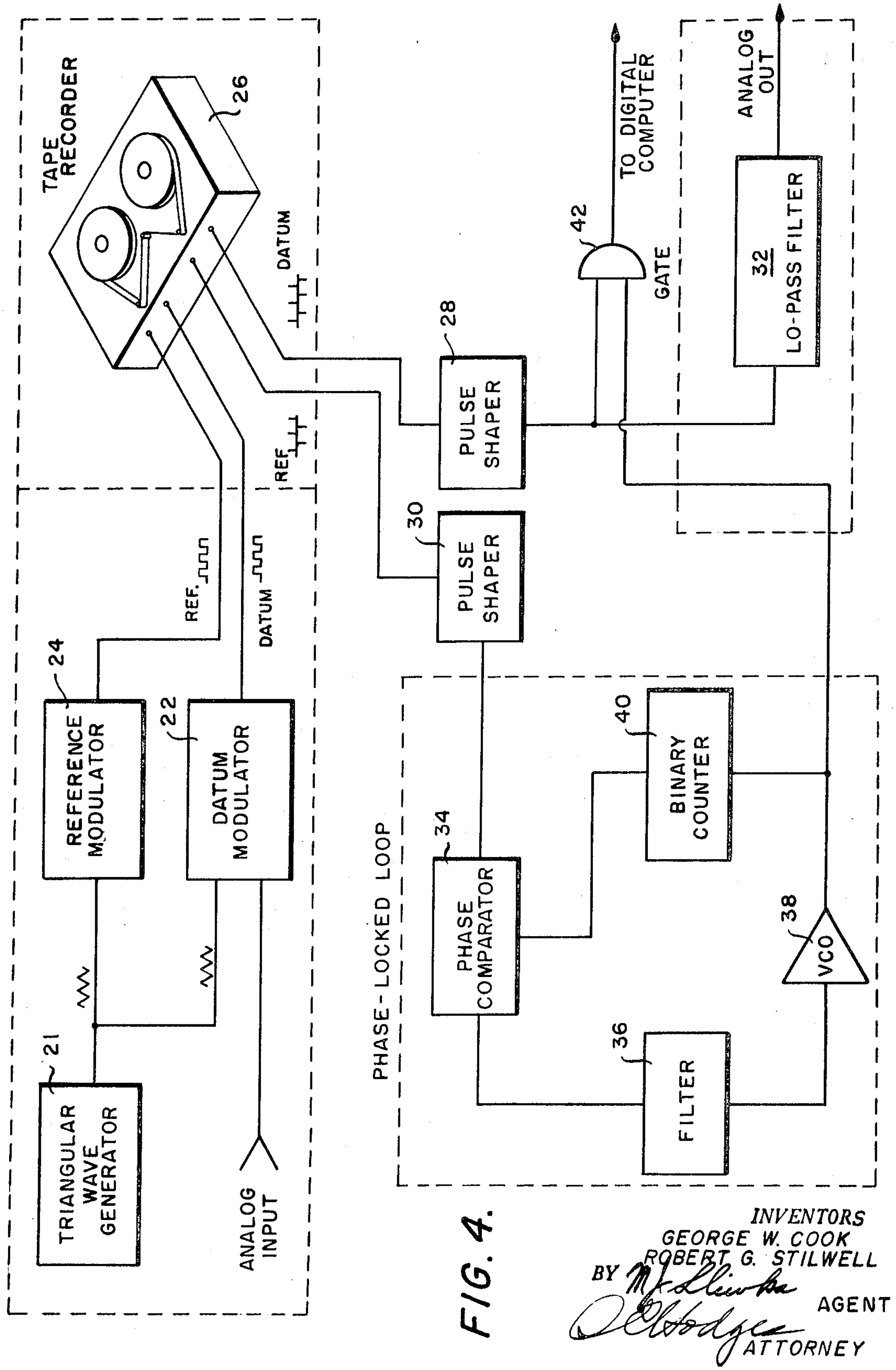
FIG. 4 is an overall schematic of a symmetrical differential pulse width recording and retrieval system.

FIG. 4 shows schematically the configuration for this dualism in data presentation. FIG. 4 shows the recording system electronics in block diagram form. In addition to the triangular wave generator 21 and the datum modulator 22, a reference modulator 24 is also utilized. The reference modulator is essentially identical to a datum modulator except that no modulating analog signal is applied. Hence the output of the reference modulator is constantly a symmetrical square wave as in FIG. 3*c*. This is recorded on one tape track of the tape recorder 26, and serves as the reference channel to be used with each datum channel upon playback.

Upon playback the square wave saturation patterns on the tape are retrieved with playback or "read" heads having short time constants, so that the reproduction is actually a series of pulse trains, one for each channel. These pulse trains are each fed into pulse shapers 28 and 30, which constructs replicas of the square waves which were recorded on the tape. From here on a great deal of flexiblity is available to permit variety in data handling procedures.

Of great importance at this point is the fact that the tape recorder 26, can be a very simple and inexpensive device capable of only the most basic functions, the most important of which is passing the tape by the heads at a reasonably constant average speed; wow and flutter of up to 20 percent can be tolerated with no degradation in system digital playback accuracy, and only minimal degradation in analog playback accuracy, this degradation being primarily in the time base.

Retrieval

The analog retrieval process can be effected simply by filtering a SDPWM wave with a low pass filter such as filter 32, whose cutoff frequency lies between the upper signal frequency and the carrier frequency. It is convenient from a practical standpoint to ensure that the reconstructed SDPWM displays amplitude symmetry; i.e., the up and down levels of the square wave are equal in magnitude but opposite in sign. Because tape speed variations are always much lower in frequency than the SDPWM signal, a speed variation will change the positive and negative portion of the SDPWM pulse proportionally and these changes cancel one another. Assuring amplitude symmetry guarantees the absence of a large d.c. component in the SDPWM signal, and ensures sufficient zero balance capability in the filter. It can be seen that the reference frequency plays no part in the above type of analog retrieval.

The simplest digital presentation is shown in FIG. 4. Here a phase-locked loop consisting of a phase comparator 34, filter 36, voltage controlled oscillator (VCO) 38, and counter 40, serves to multiply the frequency of the pulses taken from the reference track by a convenient number such as 256, 512, or 1024. The pulse generating voltage controlled oscillator 38, emits an endless train of monopolaric pulses. These are gated by the datum wave train in gate 42 and fed to an electronic counter, not shown, which is coded in the language of the computer being fed. The number of pulses contained in each gating pulse goes into the computer for programmed handling.

In this way tape speed variations are ignored by the device because the gated pulse frequency is always an exact multiple of the datum pulse frequency. Hence, the datum pulse will gate an exact number of pulses from the VCO regardless of tape speed.

The computer can also be programmed to measure with its own base the respective widths of the on-off gating pulses, subtract the difference between them and digitize this difference with the result going into the shift register of the computer.

The phaselocked loop pulses can also be fed to an "up-down" counter (not shown), whose output is coded in the language of the computer. For example, the counter counts "up" during the first part of the gating signal then "down" during the second. The residual difference goes to the register of the computer. This provides automatically both magnitude and polaric sense for each datum sample. Other modes of presentation can be visualized.

The phaselocked loop and other digital playback equipment may be part of the computer and need not necessarily be included in the recorder package. This feature permits a great reduction in size and weight for the recorder package compared to the conventional FM equipment now widely used.

Thus, we see that an overwhelming advantage is realized in the ability to record a.c. and d.c. analog signals with an absolute amplitude accuracy of better than 1 percent without the need for precise tape speed control. This feature alone provides a wide variety of related advantages such as drastically reduced equipment cost, weight, and size. For instance, an inexpensive home-type audio recorder can be made to perform as well as a high quality FM instrumentation tape recorder costing the user many thousands of dollars. In addition, the SDPWM technique can be applied to small pocket size magnetic tape recorders with considerable advantage where on-site recording in out-of-the-way, dangerous or unmanned situations are encountered. One possibility is a four or five channel unit weighing a pound or so which would run on flashlight cells, and use a cartridge instead of reels for tape handling.

A second advantage is the ability to record directly on magnetic tape in a format compatible with not only analog retrieval techniques, but also a digital retrieval technique which is ideally suited for direct entry of data into a digital computer without the use of intermediate format translations. The digital output of the recorder can, in effect, be plugged directly into the data input of the computers. An obvious savings is realized by the elimination of the analog-to-digital conversion equipment required in using FM systems. Moreover, this allows faster data reduction and quicker turn around times for users.

A further extension of the differential pulse width modulation and demodulation technique permits the multiplexing of two independent analog signals into a single DPWM wave train. This signal can be then recorded on a single track or transmitted on a single telemetry channel. Demodulation produces the two signals independently in either analog or digital form or both.

Each of the signals as it is taken from the tape is actually a PWM carrier. One of the carriers utilizes the positive slope of the triangle and the other the negative slope. Thus, they are entirely independent and can never interfere with each other. A definite advantage is realized in being able to compact nearly twice the number of channels on the tape as there are tracks. However, because the reference signal must also be recorded in order to unscramble the two channels; this advantage can be realized only for three or more channels. The actual number of channels that can be recorded is $2(n-1)$ where n is the number of tracks on the tape.

Although only the preferred embodiment of the present invention has been illustrated and described, it is apparent to one skilled in the art that changes and modifications may be made without departing from the spirit of the invention or the scope of the appended claims.

What is claimed is:

1. A symmetrical differential pulse width modulation system comprising:

means for generating a periodic symmetrical triangular reference signal having equal plus and minus slopes respectively terminating in upper and lower points of uniform periodicity;

sensing means for providing a modulating signal;

reference signal modulating means, having as inputs thereto said triangular reference signal and said modulating signal for producing a pulse width modulated signal that is symmetrical about points of uniform periodicity corresponding to said reference signal points of uniform periodicity so that said modulated signal is substantially free of phase distortion with respect to the periodicity of the reference signal.

. The system of claim 1, wherein:

said modulating means sums the reference signal with the modulating signal; and said modulating means output changes its state in response to a zero crossing of said sum.

3. The system of claim 2, including:

a recorder and playback means connected to the output of said modulating means for recording said modulated signal and said reference signal and for playing back said reference signal and said modulated signal to information retrieval means.

4. The system of claim 3, wherein:

said information retrieval means includes a phase-locked loop having an input and an output;

said input is coupled to the reference signal playback output of said recording and playback means;

said output is a train of monopolaric pulses having a frequency which is a multiple of said modulated signal frequency;

a gate having a first input coupled to the modulating signal playback output of said recording and playback means and a second input coupled to said train of monopolaric pulses;

the output of said gate being said train of monopolaric pulses gated by the modulated signal, wherein each train of gated monopolaric pulses defines the period of its corresponding gated signal independently of recording speed.

5. The system of claim 4, wherein the information retrieval means further includes;

a low pass filter connected to said modulated signal playback output of said recording and playback means;

said filter having a cut-off frequency between the upper signal frequency and the reference signal frequency;

said low pass filter output being the modulating signal input to said modulator.

6. The system of claim 5, wherein:

said modulating means is a summing amplifier latched at its positive or negative saturation voltage level in response to said zero crossings.

* * * * *